(12) United States Patent
Jin et al.

(10) Patent No.: US 6,685,584 B2
(45) Date of Patent: Feb. 3, 2004

(54) DUAL EMBOSSED COVER MATERIAL FOR SPORTING GOODS AND METHOD OF MAKING SAME

(75) Inventors: Kim Sung Jin, Suwon (KR); Douglas G. Guenther, Wheaton, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 14 days.

(21) Appl. No.: 09/998,097

(22) Filed: Nov. 30, 2001

(65) Prior Publication Data

US 2003/0104885 A1 Jun. 5, 2003

(51) Int. Cl.[7] .............................................. A63B 41/08
(52) U.S. Cl. ....................................... 473/596; 473/599
(58) Field of Search ................................. 473/599, 596, 473/597, 598; 156/147, 170, 172

(56) References Cited

U.S. PATENT DOCUMENTS

| | | | |
|---|---|---|---|
| 2,448,731 A | * | 9/1948 | Park ............................ 473/596 |
| 2,859,040 A | * | 11/1958 | Gow et al. ................... 473/596 |
| 4,284,398 A | | 8/1981 | Bokelmann ................. 425/394 |
| 4,312,827 A | | 1/1982 | Bokelmann ................. 264/321 |
| 4,928,962 A | | 5/1990 | Finley ........................... 273/65 |
| 5,310,178 A | * | 5/1994 | Walker et al. ............... 473/605 |
| 5,419,552 A | | 5/1995 | Meyer ........................... 273/65 |
| 5,427,372 A | | 6/1995 | Ratner et al. ................. 273/65 |
| 5,494,625 A | | 2/1996 | Hu ................................ 264/51 |
| 5,518,234 A | | 5/1996 | Palmquist ..................... 273/65 |
| 5,669,838 A | | 9/1997 | Kennedy et al. ............ 473/596 |
| 5,681,233 A | | 10/1997 | Guenther et al. ........... 473/605 |
| D408,876 S | | 4/1999 | Feeney ....................... D21/707 |
| 5,984,812 A | * | 11/1999 | Sassak ........................ 473/596 |
| 6,032,495 A | | 3/2000 | Leu ................................ 68/17 |
| 6,283,881 B1 | | 9/2001 | Feeney ........................ 473/596 |

\* cited by examiner

Primary Examiner—Kien T. Nguyen
(74) Attorney, Agent, or Firm—Terence P. O'Brien

(57) ABSTRACT

A game ball having improved gripability. The game ball includes a bladder and a cover. The cover is positioned over the bladder. The cover has an inner surface and an outer surface. The cover has a first impression pattern formed into, and covering at least a portion of, the outer surface. The first impression pattern forms a plurality of outwardly extending raised surfaces on the outer surface. The cover further has a second impression pattern formed into the raised surfaces of the outer surface. The second impression pattern is configured to improve the gripability of the game ball.

18 Claims, 7 Drawing Sheets

DUAL EMBOSSED COVER MATERIAL FOR SPORTING GOODS AND METHOD OF MAKING SAME

FIELD OF THE INVENTION

The present invention relates generally to a dual embossed cover material for sporting goods products. In particular, the present invention relates to a cover material having a dual embossed outer surface wherein the cover material is configured for use on a sporting good product, such as, for example, a game ball, a mitt, a golf club grip, a tennis racquet grip or a baseball bat grip.

BACKGROUND OF THE INVENTION

Sporting goods products, such as game balls and mitts, are well known. Game balls typically include an inflatable bladder positioned within an outer casing or cover. Additionally, game balls can also typically include one or more layers of material between the bladder and the cover. Covers of game balls are commonly formed of rubber, leather, synthetic leather or a polymeric material. Mitts typically include an outer shell formed by a front ply and a back ply, and a webbing or pocket. The outer shell of a mitt is commonly formed of a leather, a synthetic leather or other synthetic material.

Sporting goods products, such as game balls and mitts, face a number of ever present challenges. One such challenge is to produce a game ball with improved gripping and tactile characteristics or a mitt with enhanced ball catching and retention characteristics. As such, the outer surface of game balls, such as basketballs and footballs, typically include a pebbled texture to improve the gripability of the ball. Also, many mitts include a padded front ply to enhance a player's ability to catch and retain a ball with a mitt.

Even though these innovations have improved the performance of these products, further improving the gripping and tactile characteristics of game balls and other sporting goods products is desired. In basketball and football, as in many other sports, the gripping and tactile characteristics of the game ball can considerably affect the performance of the participating players. In particular, the gripability of the outer surface of the game ball can significantly affect the player's ability to catch, retain or dribble the ball effectively, and to pass or shoot the game ball accurately and for the desired distance. Further, in game conditions, players' perspiration, or the game time weather conditions, can negatively affect the player's ability to properly grip the ball for passing, catching, shooting and dribbling.

Others have attempted to improve the gripability of game balls by adding elongate primary and supplemental projections outwardly extending from panels connected to the exterior surface of a carcass of the game ball. The elongate primary projections are formed as expansive loops and the elongate supplemental projections are formed as lines, dogbone shapes, Y-shapes, or T-shapes. This type of proposed solution can represent a radical departure from the design and look of a traditional game balls. Not surprisingly, these types of radical design changes are typically not widely accepted, particularly in organized play. Moreover, the alleged improvement in gripability is generally unproven.

Additionally, there is an ever present need to improve the feel of the sporting goods product during use. A sporting goods product with an improved feel can improve a player's level of play. There is also a continuing desire to produce a game ball with an improved aesthetic. Moreover, it is desirable to maximize the feel and gripability of the game ball at an affordable price. The cost of cover materials is a significant contributor to the cost of a game ball. Not surprisingly, the operational characteristics and overall "feel" of the ball also vary depending upon the material selected.

Thus, there is a continuing need for a cover material for sporting goods equipment, such as, for example, a basketball, a mitt, a golf club grip, a tennis racquet grip or a baseball bat grip, that improves the gripping and tactile characteristics of the sporting goods item without radically departing from the ball's traditional design. It would be advantageous to provide a game ball with an improved, more appealing aesthetic. What is needed is a cost effective method of producing a sporting goods product, such as a game ball a mitt, a golf club grip, a tennis racquet grip or a baseball bat grip, with improved gripping and tactile characteristics.

SUMMARY OF THE INVENTION

The present invention provides a game ball having improved gripability. The game ball includes a bladder and a cover. The cover is positioned over the bladder. The cover has an inner surface and an outer surface. The cover has a first impression pattern formed into, and covering at least a portion of, the outer surface. The first impression pattern forms a plurality of outwardly extending raised surfaces on the outer surface. The cover further has a second impression pattern formed into the raised surfaces of the outer surface. The second impression pattern is configured to improve the gripability of the game ball.

According to a principal aspect of a preferred form of the invention, a sheet of material for sporting goods products includes an outer layer. The sheet has improved gripability characteristics. The outer layer has an outer surface. The outer surface has a first impression pattern formed into it. The first impression pattern covers at least a portion of the outer surface. The first impression pattern forms a plurality of outwardly extending raised surfaces on the outer surface. The outer layer further has a second impression pattern formed into the raised surfaces of the outer surface. The second impression pattern is configured to improve the gripability characteristics of the sheet.

According to another preferred aspect of the invention provides a method of making a game ball includes the following steps: obtaining a bladder; obtaining a sheet of cover material having an outer side and an inner side; impressing generally overlapping first and second tactile patterns onto the outer side of the sheet; forming the sheet of cover material into at least a portion of one cover; and disposing the cover over the bladder. The first tactile pattern forms a plurality of raised surfaces on the outer side of the sheet. The second tactile pattern is formed into the raised surfaces. The second tactile pattern improves the gripability of the sheet.

According to another preferred aspect of the invention provides a method of making a game ball includes the steps of: obtaining a bladder; obtaining a mold having an inner mold surface; inserting the bladder within the mold; inserting cover material into the mold; molding a cover over the bladder using the mold; and removing the molded game ball from the mold. The inner mold surface is configured to form a pebbled texture onto the game ball. The pebbled texture includes a plurality of raised surfaces. The inner mold surface is also configured to form a second impression pattern onto the raised outer surfaces of the pebbled texture of the game ball. The cover includes an outer surface. The outer surface has the pebbled texture and the second impression pattern formed into the raised outer surfaces. The cover has the pebbled texture and the second impression pattern extending across at least 40% of the outer surface of the game ball.

According to another preferred aspect of the invention provides a method of making a game ball includes the steps of: obtaining a bladder; positioning a cover over the bladder; obtaining an embossing mold having an inner mold surface; embossing the cover with the embossing mold; and removing the game ball from the embossing mold. The inner mold surface is configured to form a pebbled texture, including a plurality of raised surfaces, onto the game ball. The inner mold surface is also configured to form a second impression pattern onto the raised outer surfaces of the pebbled texture of the game ball. The embossed cover includes an outer surface having the pebbled texture and the second impression pattern formed into the raised outer surfaces of the pebbled texture. The cover having the pebbled texture and the second impression pattern extending across at least 40% of the outer surface of the game ball.

This invention will become more fully understood from the following detailed description, taken in conjunction with the accompanying drawings described herein below, and wherein like reference numerals refer to like parts.

DETAILED DESCRIPTION OF THE PREFERRED EMBODIMENTS

Figure 1:
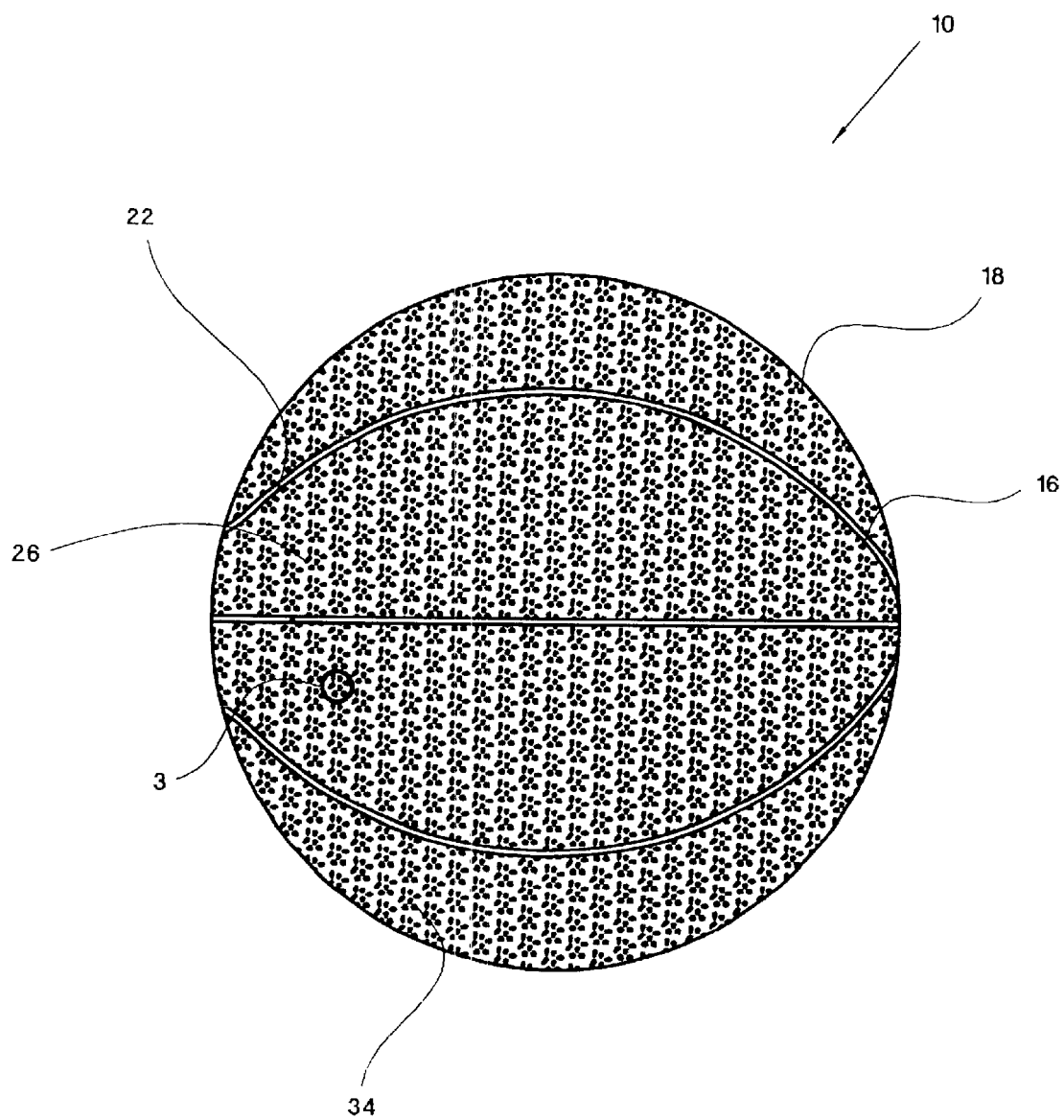
FIG. 1 is a front plan view of a basketball in accordance with a preferred embodiment of the present invention.
Figure 2:
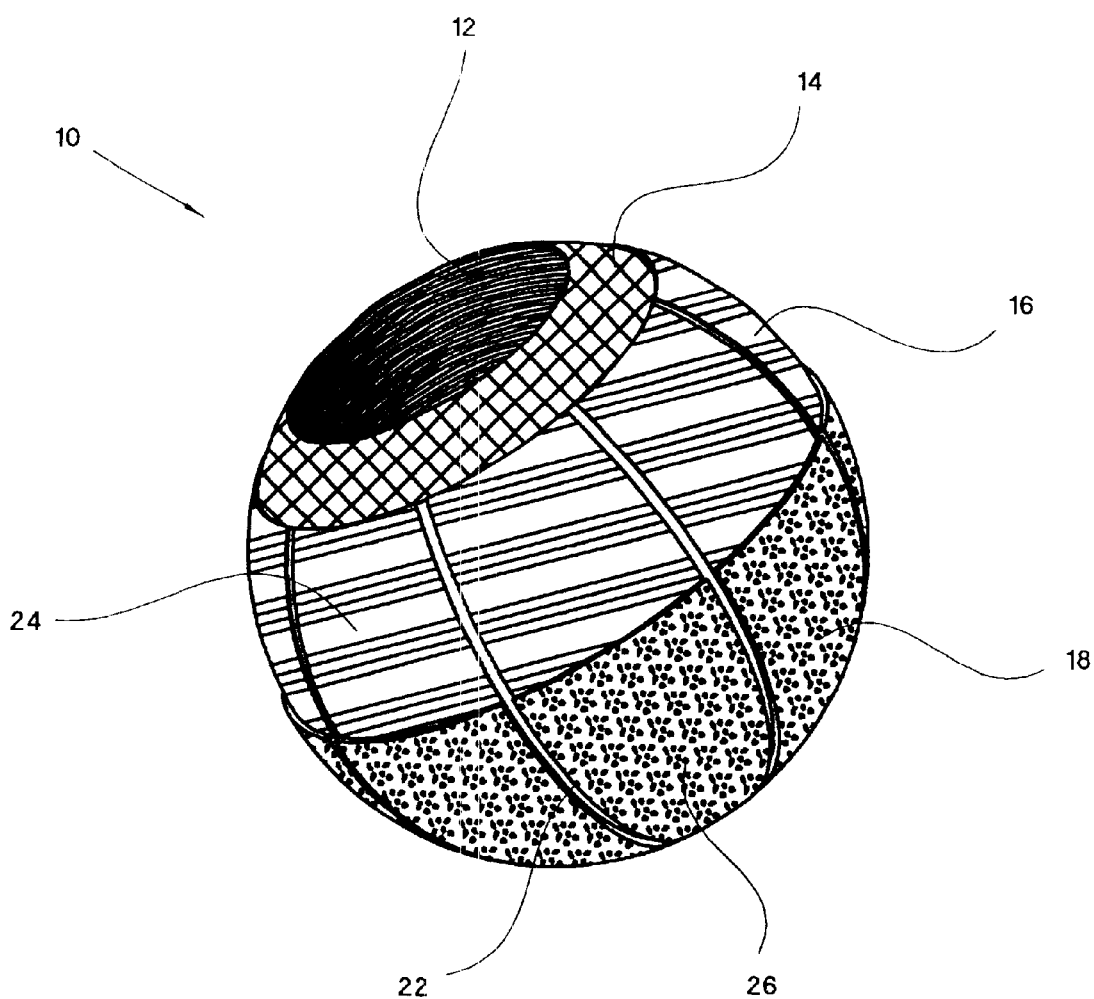
FIG. 2 is a layered sectional view of the basketball of FIG. 1.

Referring to FIGS. 1 and 2, a basketball is indicated generally 10. The basketball 10 is one example of a game ball. The present application is directly applicable to other games balls, including, for example, footballs, rugby balls, soccer balls, and volleyballs, and to other sporting goods products including, for example, mitts.

The basketball 10 is a spherical inflatable object. The basketball 10 preferably includes a bladder 12, a layer of windings 14, a carcass 16 and a cover assembly 18. The bladder 12 is an inflatable air tube preferably having a spherical shape. The bladder 12 is disposed within the windings 14, the carcass 16 and the cover assembly 18. In an alternative preferred embodiment, the bladder 12 can disposed directly within the cover assembly 18. The bladder 12 enables the basketball 10 to retain a predetermined amount of air thereby achieving the desired air pressure within, or firmness to, the basketball 10. The bladder 12 is typically made of latex, butyl rubber or other suitable material. The bladder 12 includes a valve (not shown) that extends through the windings 14, the carcass 16 and the cover assembly 18 for access by a user.

The layer of windings 14 includes one or more elongate threads 20, which are wound around the bladder 12. The threads 20 form a layer of windings 14 that reinforces the bladder 12 and retains the spherical shape of the bladder 12. The threads 20 are formed of a high tensile strength material, preferably nylon. In alternative embodiments, the thread 20 can be a textile, a wire, or other conventional thread material. In a particularly preferred embodiment, the layer of windings 14 is comprised of 2100 meters of 210 denier Nylon thread.

The carcass 16 is a spherical body disposed over the layer of windings 14. In a preferred embodiment, the carcass 16 is formed by placing a plurality of carcass segments onto an outer surface of the windings 14 and then molding the carcass segments over the wound bladder 12 to produce a uniform spherical layer of material. The material of the carcass 16 can also be injected, or otherwise inserted, within a mold to form the carcass 16. The carcass 16 is made of an elastic material, preferably, a latex. Alternatively, the carcass 16 can be made of other materials such as a butyl rubber, a natural rubber or a synthetic polymeric plastic material. In another alternative embodiment, the carcass 16 can be a multi-layered body including one or more layers of fabric or elastomeric material.

The carcass 16 preferably is formed with a plurality of inwardly extending channels 22. The channels 22 define a plurality of cover attachment regions 24 about the outer surface of the carcass 16. Each cover attachment region 24 is configured to receive at least one cover panel 26. In an alternative preferred embodiment, the carcass 16 can include a plurality of outwardly extending ribs in lieu of the inwardly extending channels 22. In another alternative embodiment, the carcass 16 can be formed with a substantially spherical outer surface without channels or ribs.

The cover assembly 18 is preferably comprised of a plurality of cover panels 26. The cover panels 26 are single or multi-layered sheets of material that are coupled to the cover attachment regions 24 of the carcass 16. Preferably, the cover panels 26 are laminated to the cover attachment regions 24 of the carcass 16. Alternatively, the cover panels 26 can be attached to the carcass 16 by other means, such as, for example, stitching, molding, pressing, bonding. The cover assembly 18 is configured for impact with one or more playing surfaces and for contact with players of the game ball 10. In an alternative preferred embodiment, the cover assembly 18 can be connected directly to the bladder 12 or to the layer of windings 14.

Figure 3:
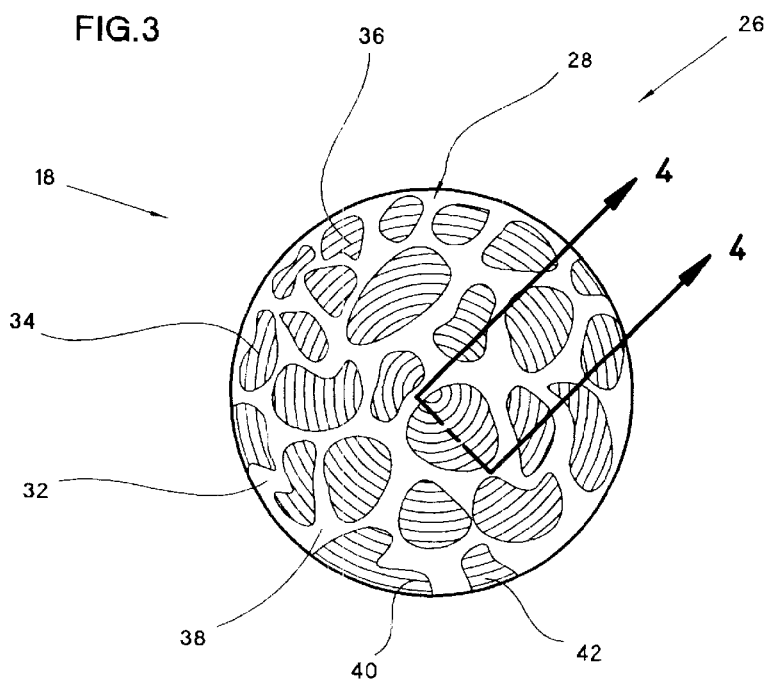
FIG. 3 is a sectional, front view of the outer surface of a cover assembly of the basketball of FIG. 1.
Figure 5:
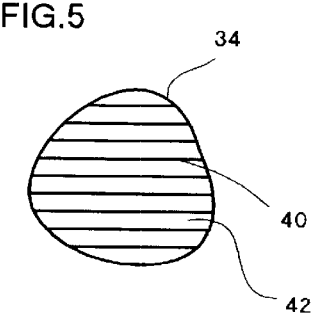
FIGS. 5 through 11 are top views of alternative secondary impression patterns on a pebble-like projection of the cover assembly of the basketball in accordance with alternative preferred embodiments of the present invention.
Figure 6:
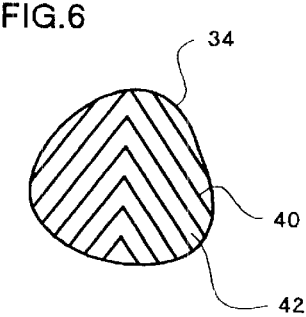
Figure 7:
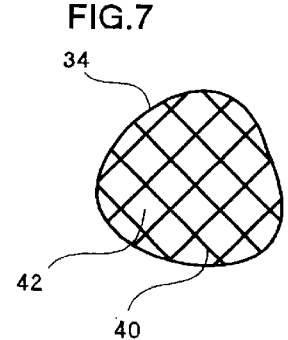
Figure 8:
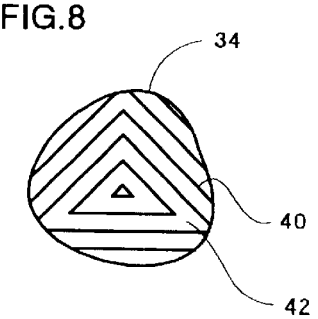
Figure 9:
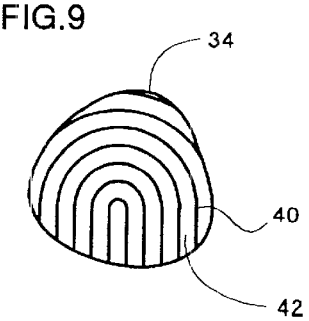
Figure 10:
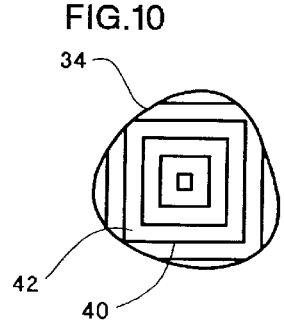
Figure 4:
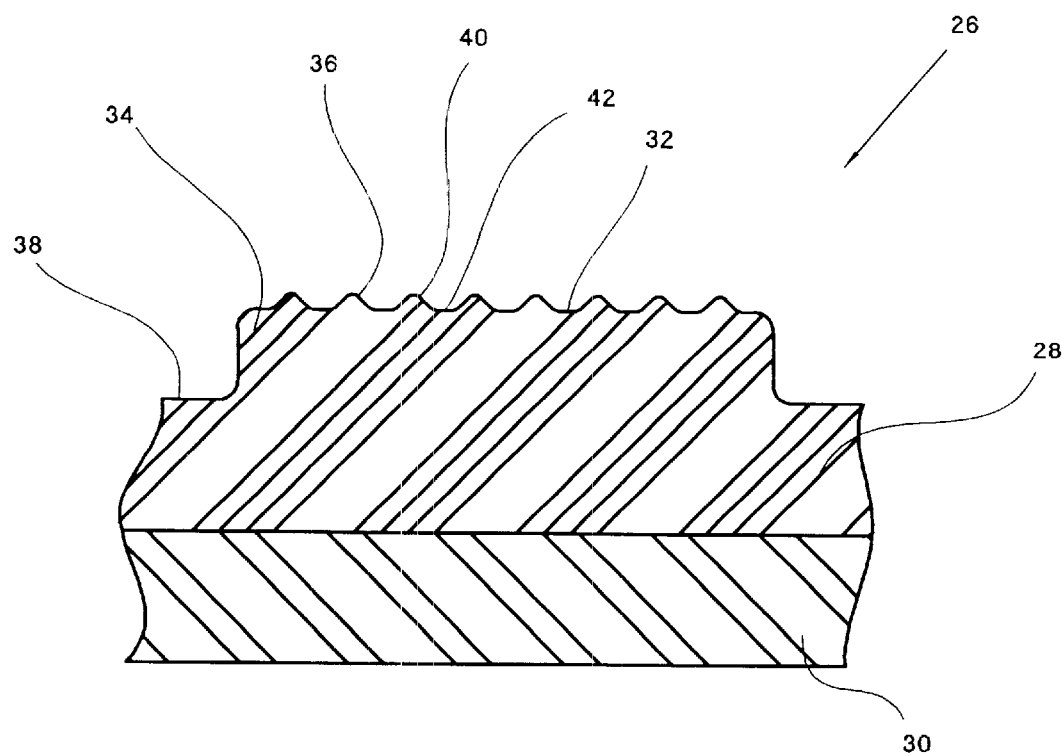
FIG. 4 is a cross-sectional view of the cover assembly of FIG. 3.
Figure 11:
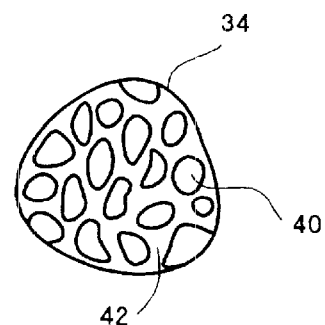

Referring to FIGS. 3 and 4, the cover assembly 18 is shown in greater detail. The cover panels 26 of the cover assembly 18 are preferably formed of a wear resistance outer layer 28 and a backing 30. The outer layer 28 is attached to, and preferably affixed to, the backing 30. The outer layer 28 of the cover panel 18 can be formed of a leather, synthetic leather, a rubber, a polyurethane, or other thermoset or thermoplastic material. The backing 30 is made of a soft material, preferably a felt-like fabric. Alternatively, the backing 30 can be formed of other materials, such as, for example, other woven or unwoven fabrics. The backing 30 is preferably configured to contact the outer surface of the carcass 16 (see FIG. 2). Alternatively, the backing 30 can directly contact the layer of windings 14 (see FIG. 2) or the bladder 12 (see FIG. 2). In another alternative preferred embodiment, the cover panels 18 can be formed without a backing.

An outer surface 32 of the outer layer 28 of the cover panels 18 is formed with first and second impression patterns. The first impression pattern forms a plurality of outwardly extending raised surfaces. Preferably, the first impression pattern forms a plurality of pebble-like projections 34 on the outer surface 32 of the outer layer 28 that are similar to the pebbled texture of a conventional basketball or football. The pebble-like projections 34 include raised surfaces 36. The first impression pattern also preferably forms a plurality of interconnected bands 38 that space apart the pebble-like projections 34. The bands 38 preferably inwardly extend into the outer surface 32 of the outer layer 28. The pebble-like projections 34 improve the gripability of the basketball 10. In alternative preferred embodiments, the first impression pattern can form other non-pebble like shapes onto the outer surface 32 of the outer layer 28.

The second impression pattern includes a plurality of ridges 40 spaced apart by a plurality of grooves 42 which are formed into the raised surfaces 36 of the pebble-like projections 34. Referring to FIG. 3, the spaced apart ridges 40 on each pebble-like projection form at least a portion of an arrangement. In one preferred embodiment, the spaced apart ridges 40 produce an arrangement of spaced apart concentric circular segments on the pebble-like projections 34, such that, when viewed in a group, the arrangement resembles a plurality of spaced apart concentric circles formed into the raised surfaces 36 of the group of pebble-like projections 34.

The first and second impression patterns extend across at least 40 percent of the outer surface 32 of the cover assembly 18, and preferably over 80 percent, of the outer surface 32 of the cover assembly 18. A portion of the cover assembly 18 can include alphanumeric indicia or graphical images representative of the source of the product, characteristics of the product, or advertising information.

The first and second impression patterns formed into the outer surface 32 provide an increased frictional interaction between the player and the basketball 10 thereby significantly improving the gripability of the basketball 10. The first and second impression patterns formed into the outer surface 32 of the basketball 10 enhance a player's ability to catch, pass, shoot and dribble the basketball 10 more effectively and reliably. The improved gripability of the basketball 10 provided by the overlapping first and second impression patterns can also contribute to an increase in shooting accuracy and percentage, as well as reduction in turnovers, by enabling the player to grasp and control the basketball 10 more effectively. The first and second impression patterns also improve the user's overall feel of the product.

When applied to other game balls, such as, footballs, the improved gripability of the first and second impression patterns formed into the outer surface of the football can facilitate a player's ability to firmly grasp, throw or catch the football. The improved gripability can also assist in reducing turnovers and incompletions. The dual impressed outer surface of the game ball is also well-suited for inclement weather or game conditions where players' perspiration can play a role in the ability to grasp and control a game ball. When applied to other sporting good products, such as, a baseball or softball mitt, the front ply and webbing of the mitt can be formed with the first and second impression patterns to improve the player's ability to catch and retain a ball. An example of the improved gripability of produced by the first and second impression patterns onto a basketball is illustrated in the example below.

EXAMPLE

The present invention will be better understood by the following example or test, which is not meant to be limiting. The example has been given for clarity of understanding only. No unnecessary limitations are to be understood therefrom. The invention is not limited to the exact details shown and described, for variations obvious to one skilled in the art will be included within the invention defined by the claims.

Two basketballs were obtained. The first basketball was a conventional basketball having a conventional pebbled (single embossed) texture on its outer surface. In particular, the first basketball was a Jet Tournament Edition (Stock # B1230) model basketball produced by Wilson Sporting Goods, Co. The conventional basketball included a synthetic leather cover assembly and was inflated to an internal air pressure of 8 psi prior to testing. The second basketball was the basketball 10, made under the preferred embodiment of the invention as described above and shown in FIGS. 1–4. The second basketball was identical to the first basketball except that the second basketball included the first and second impression patterns (also referred to as being dual embossed).

A basketball grip testing (or gripper) machine was obtained. The grip testing machine includes three projection arms each having spherical metal gripping member. The grip testing machine enables the three grip members to contact a basketball at a predetermined and constant force selected from a large range of available settings. The three grip members contact the basketball at the three locations on the upper hemispherical portion of the basketball. Each contact location is made at a location on the cover panels of the basketballs that does not include a channel, or alphanumeric or graphical impressions. The grip testing machine engages and suspends the basketball off the ground solely through contact by the three grip members. A timing device, such as a calibrated stop watch, is then used to measure the amount of time that the basketball is suspended off the ground by the grip testing machine.

Table 1 below includes grip test times from thirty test trials performed on each of the first and second basketballs. The test trials involved inflating the first and second basketballs to 8 psi, alternately inserting the first and second basketballs into the the grip test machine, setting the grip test machine to a predetermined grip force of 4.5 lbf, initiating engagement of the three grip members with the basketball at the predetermined grip force, and timing the duration of contact between the grip members and the basketball.

TABLE 1

| Second Basketball Dual Embossed | | First Basketball Single Embossed | |
|---|---|---|---|
| Trial # | Time (sec) | Trial # | Time (sec) |
| 1 | 74.56 | 1 | 42.56 |
| 2 | 79.25 | 2 | 32.40 |
| 3 | 94.91 | 3 | 32.00 |
| 4 | 70.78 | 4 | 32.62 |
| 5 | 80.78 | 5 | 32.19 |
| 6 | 100.53 | 6 | 32.28 |
| 7 | 100.94 | 7 | 42.56 |
| 8 | 111.47 | 8 | 38.00 |
| 9 | 111.28 | 9 | 64.44 |
| 10 | 95.78 | 10 | 28.85 |
| 11 | 81.47 | 11 | 26.85 |
| 12 | 85.09 | 12 | 32.65 |
| 13 | 84.47 | 13 | 27.94 |
| 14 | 94.91 | 14 | 28.91 |
| 15 | 91.15 | 15 | 26.25 |
| 16 | 90.25 | 16 | 24.32 |
| 17 | 89.18 | 17 | 26.81 |
| 18 | 85.16 | 18 | 28.84 |
| 19 | 78.37 | 19 | 25.81 |
| 20 | 73.41 | 20 | 28.59 |
| 21 | 70.72 | 21 | 25.90 |
| 22 | 72.06 | 22 | 28.40 |
| 23 | 66.62 | 23 | 25.00 |
| 24 | 88.72 | 24 | 25.53 |
| 25 | 76.56 | 25 | 24.28 |
| 26 | 72.06 | 26 | 24.16 |
| 27 | 94.97 | 27 | 27.59 |
| 28 | 98.88 | 28 | 26.27 |
| 29 | 90.53 | 29 | 25.22 |
| 30 | 100.69 | 30 | 28.25 |
| Average | 86.85 | Average | 30.52 |
| Standard Dev | 12.12 | Standard Dev | 8.01 |

The test trial results of Table 1 indicate that the average duration of contact for the first and second basketballs over the thirty test trials was 30.52 seconds and 86.85 seconds, respectively. The average duration of contact between the grip members and the second basketball was over twice as long and nearly three times as long (285 percent longer) as the average duration of contact between the grip members and the first conventional basketball.

The second impression pattern also imparts an appealing, subtle, secondary, visible appearance to the outer surface of the basketball 10. Light reflects off of the second impression pattern of the basketball 10 to produce this improved subtle aesthetic. The improved aesthetic produced by the secondary impression pattern provides the cover assembly 18 with a deep, high quality appearance that is more attractive than a conventional basketball 10 having the conventional pebbled texture.

Further, the first and second impression patterns enable the gripability and aesthetics of the basketball 10 to be improved in a cost-effective manner. The first and second impression patterns can be applied to the basketball 10 without significantly increasing the manufacturing cost of the basketball.

Referring to FIGS. 5 through 11, alternative preferred embodiments of the basketball 10 having first and second impression patterns are illustrated. The spaced apart ridges 40 formed by the second impression pattern can be alternatively shaped to provide alternative preferred arrangements. The alternative preferred arrangements include spaced apart ridges 40 forming spaced apart line segments, spaced apart angled segments, spaced apart concentric circles, spaced apart triangles, spaced apart oval segments, and spaced apart rectangular segments. In another alternative preferred embodiment, the second impression pattern can include an arrangement of intersecting ridges 40 forming a cross-hatched pattern on the raised surfaces of the pebble-like projections 34. In another alternative preferred embodiment, the second impression pattern can include a plurality of spaced apart ridges forming an arrangement resembling a finger-print on the raised surfaces of the pebble-like projections 34. In another alternative preferred embodiment, also referred to as the pebbles on pebbles configuration, the second impression pattern can form ridges 40 shaped in the form of pebble-like projections on the pebble like projection 34 formed by the first impression pattern. The pebble-like projection ridges 40 are spaced apart by the channels 42. In other alternative preferred embodiments, the ridges 40 can be formed in an arrangement of irregular shaped ridges, polygonal ridges, elliptical ridges and combinations thereof.

Figure 12:
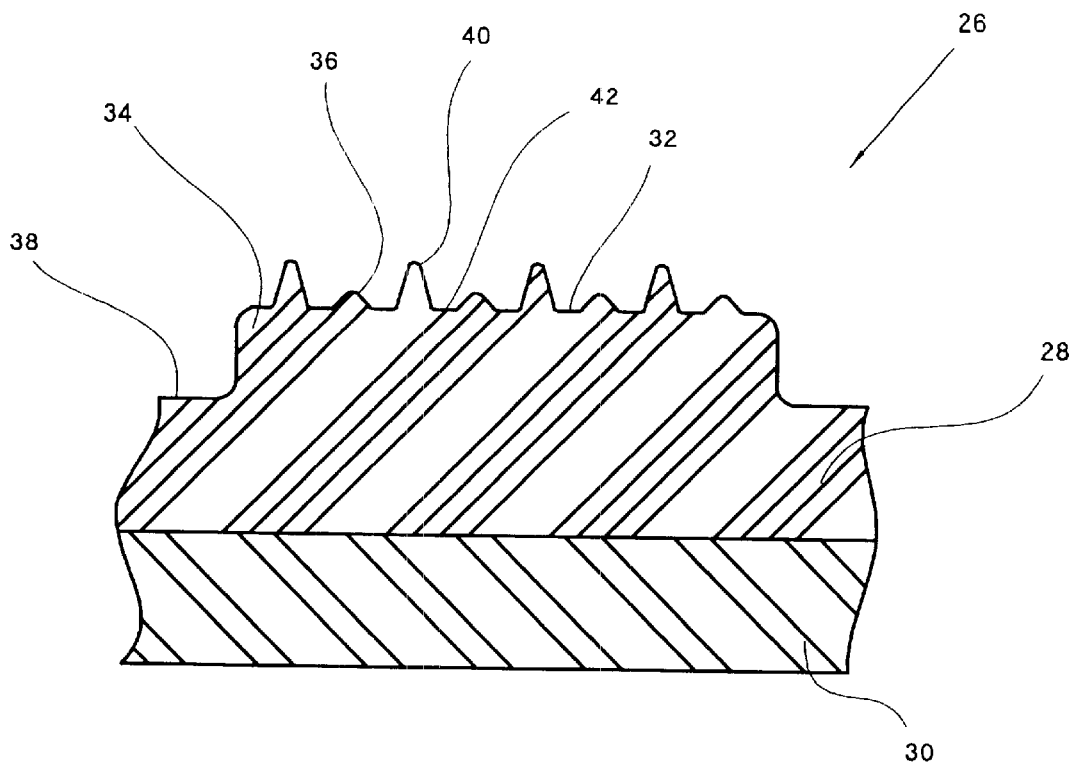
FIG. 12 is a cross-sectional view of the cover assembly of FIG. 3 in accordance with an alternative preferred embodiment of the present invention.

Referring to FIG. 12, an alternative preferred embodiment of the cover panels 26 of the basketball 10 is illustrated. In this alternative preferred embodiment, the second impression pattern can form ridges 40 of varying height in the raised surfaces of the pebble-like projection 32 formed by the first impression pattern. The ridges 40 are spaced apart by a plurality of channels 42.

Figure 13:
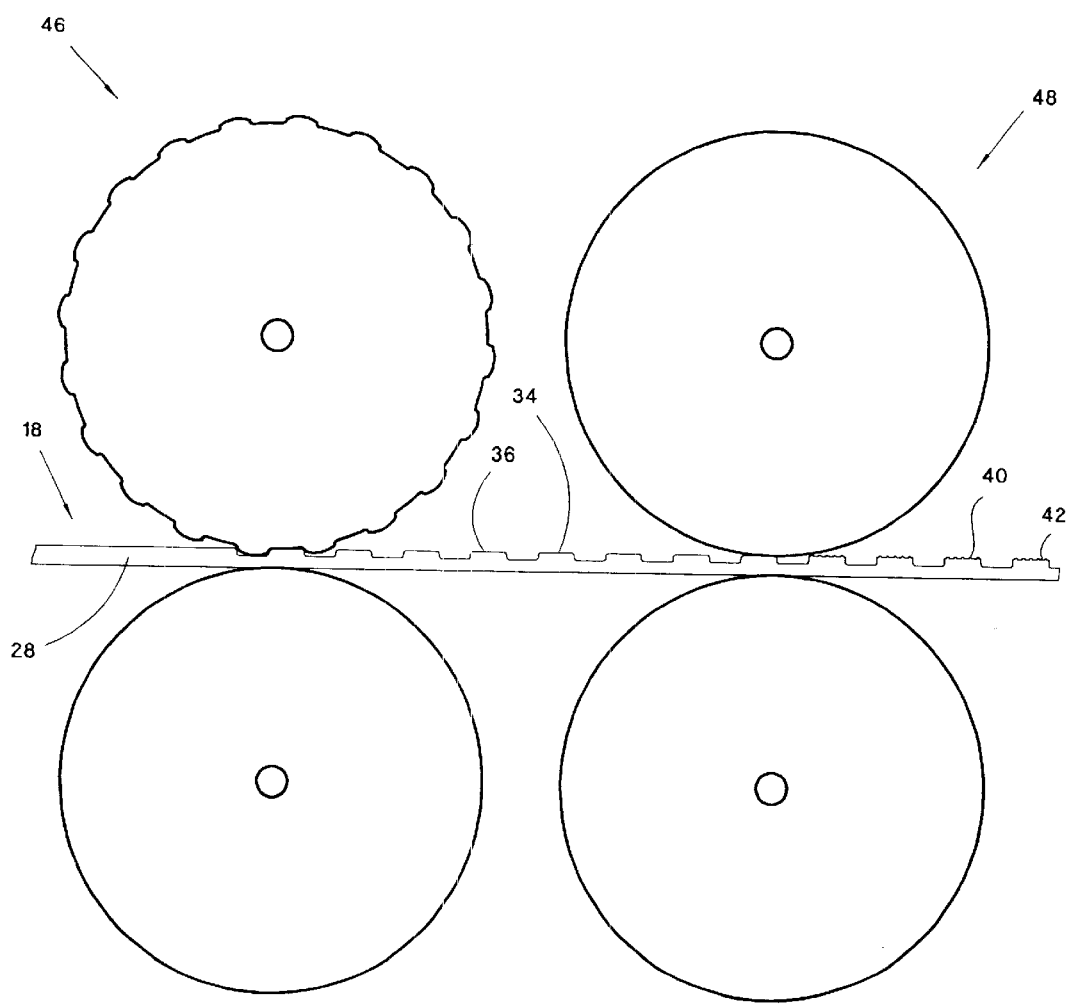
FIG. 13 illustrates producing the cover assembly with first and second impression patterns in accordance with a preferred method of the present invention.

FIG. 13 illustrates a preferred method of producing the first and second impression patterns onto the cover assembly 18 of the basketball 10. The method includes the steps of obtaining a sheet of cover material. The sheet of cover material preferably consists solely the outer layer 28. In an alternative preferred embodiment, the sheet of cover material can include the outer layer 28 and the backing 30. The sheet of cover material is passed through a first embossing machine 46 to impress the first impression pattern onto the outer surface 32 of the sheet of cover material. The sheet of cover material is then passed through a second embossing machine 48 to impress the second impression pattern onto the raised surfaces 36 formed into the outer layer 28. The first and second embossing machines 46 and 48 preferably emboss using pressure only. Alternatively, the embossing machines 46 and 48 can use a combination of heat and pressure. When using such a machine, the method would also include curing the cover material. In another alternative preferred method, the second impression can be embossed onto the sheet of cover material by passing the sheet through the first embossing machine a second time, wherein the first embossing machine is reconfigured to produced the second impression pattern. In another alternative preferred embodiment, the first and second impression patterns can be applied to the cover material using a single pass through a single embossing machine.

The method further includes obtaining the bladder 12, winding the bladder 12 with the layer of windings 14, and then disposing a carcass 16 over the layer of windings 14. The cover material having the first and second impression patterns is then preferably stamped out or cut out into a plurality of cover panels. The cover panels 16 preferably have "fish-like" shape that readily conforms to the cover attachment regions 24 of carcass 16 of the basketball 10. The cover panels 26 are then coupled to the cover attachment regions 24 of the carcass 16. In alternative preferred methods, the cover panels 16 can be directly connected to the layer of windings 14 or to the bladder 12.

In a preferred method, the first and second embossing machines each comprise a pair of rollers wherein one roller imparts the impression pattern onto the outer surface 32 of the outer layer 28 and the other roller contacts the underside of the sheet of cover material. In alternative preferred embodiments, the first and second embossing machines can take alternative forms, such as one or more presses or stamping devices.

Figure 14:
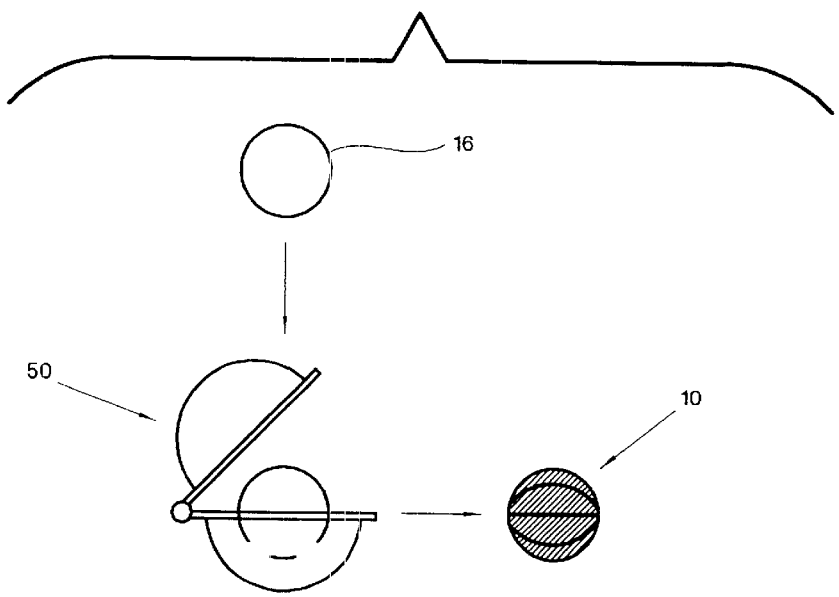
FIG. 14 illustrates producing the basketball having the cover assembly with first and second impression patterns in accordance with an alternative preferred method of the present invention.

Referring to FIG. 14, another alternative preferred method of producing the basketball 10 is illustrated. The alternative method includes the steps of obtaining the bladder 12 and a first mold 50 having an inner mold surface. The inner mold surface is configured to form the first impression pattern, preferably a pebbled texture, including the plurality of raised surfaces, onto the basketball 10. The inner mold surface is also configured to form the second impression pattern onto to the raised surfaces of the pebbled texture. The inner mold surface is also configured to apply the first and second impression patterns each over at least 40 percent of the outer surface of the game ball. The method further includes inserting the bladder 12 into the first mold 50, then inserting the cover material into the first mold 50, and then molding the cover assembly 18 over the bladder using the first mold 50. The cover assembly 18 includes the first and second impression patterns and is comprised of a single cover piece extending substantially around the entire bladder 12. The cover assembly 18 is then cured. The basketball 10 produced through this method is substantially similar to the basketball 10 of the previously described method. In an alternative preferred method, the bladder 12 is wound with the layer of winding 14 and the carcass 16 is displaced over the layer of windings 14 before the bladder 12, including the layer of windings 14 and the carcass 16, is placed into the embossing mold 50. The embossing mold 50 can have a general spherical shape for producing basketballs 10 or other spherical game balls. Alternatively, the embossing mold 50 can have a general prolate spheroidal shape.

Figure 15:
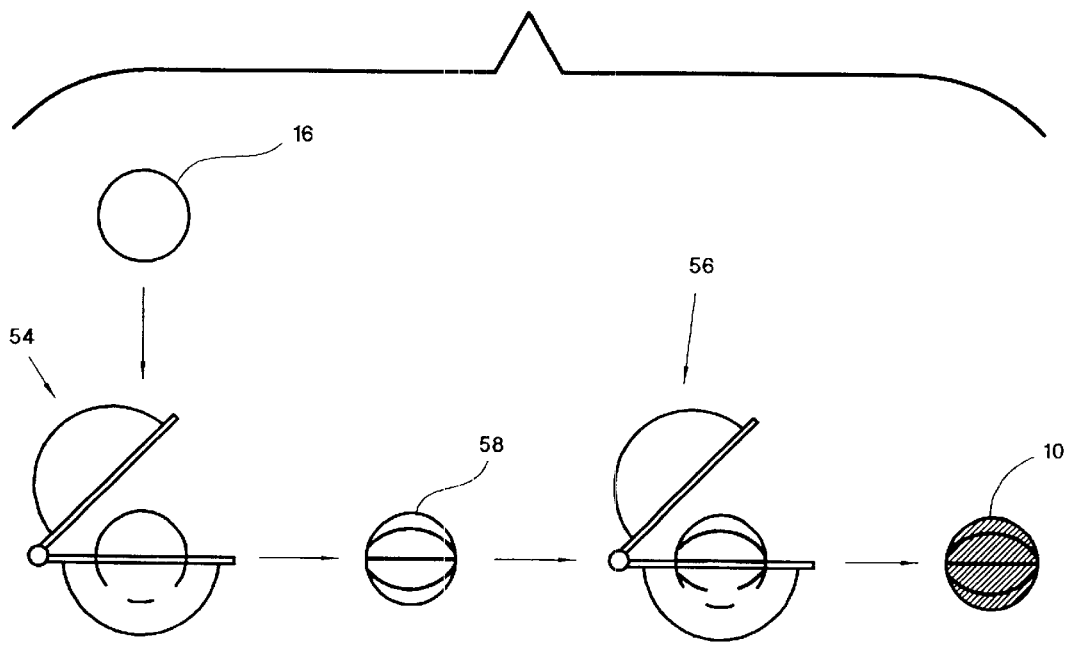
FIG. 15 illustrates producing the basketball having the cover assembly with first and second impression patterns in accordance with an alternative preferred method of the present invention.

Referring to FIG. 15, another alternative preferred method of producing the basketball 10 is illustrated. The alternative method includes the steps of obtaining a bladder, a second mold 54, and an embossing mold 56. The second told 54 has an inner mold surface configured to form a basketball 58 having a plurality of channels 60. Alternatively, the second mold 54 can produce a basketball having a smooth spherical cover or a basketball with a plurality of channels and the pebbled texture of the first impression pattern. The embossing mold 56 includes an inner surface configured to form the first impression pattern, preferably a pebbled texture, including the plurality of raised surfaces, and the second impression pattern onto to the raised surfaces of the pebbled texture. The inner mold surface of the embossing mold 56 is also configured to apply the first and second impression patterns each over at least 40 percent of the outer surface of the game ball.

The method further includes inserting the bladder 12 into the second mold 54, then inserting the cover material into the second mold 54, and then molding a cover over the bladder 12 using the second mold 54. The cover is comprised of a single cover piece extending substantially around the entire bladder 12. In an alternative preferred method, the bladder 12 is wound with the layer of winding 14 and the carcass 16 is displaced over the layer of windings 14 before the bladder 12, including the layer of windings and the carcass, is placed into the second mold 54. The basketball 58 is then inserted into the embossing mold 56. The embossing mold 56 is used to emboss the cover of the basketball 58 with the first and second impression patterns. The first impression pattern is preferably a pebbled texture having a plurality of raised surfaces and the second impression pattern is formed into the raised surfaces. The basketball 10 is then removed from the embossing mold 56. The basketball 10 produced through this method is substantially similar to the basketball 10 of the previously described methods. The embossing mold 56 can have a general spherical shape for producing basketballs 10 or other spherical game balls. Alternatively, the embossing mold 50 can have a general prolate spheroidal shape.

The methods described above are also directly applicable to other game balls and other sporting goods products. While the preferred embodiments of the present invention have been described and illustrated, numerous departures therefrom can be contemplated by persons skilled in the art. Therefore, the present invention is not limited to the foregoing description but only by the scope and spirit of the appended claims.

What is claimed is:

1. A game ball having improved gripability, the game ball comprising:
   a bladder; and
   a cover positioned over the bladder, the cover having an inner surface and an outer surface, the cover having a first impression pattern integrally formed into the outer surface, the first impression pattern forming at least fifty outwardly extending raised surfaces on the outer surface, the cover further having a second impression pattern integrally formed into the raised surfaces of the outer surface, the first and second impression patterns generally covering the outer surface of the game ball, the second impression pattern configured to improve the gripability of the game ball.

2. The game ball of claim 1 wherein the first impression pattern includes a pebbled texture.

3. The game ball of claim 2 wherein the second impression pattern forms a plurality of outwardly extending pebble-like projections onto the raised surfaces of the outer surface.

4. The game ball of claim 1, wherein the second impression pattern includes a plurality of spaced apart ridges and wherein the plurality of spaced apart ridges form at least a portion of an arrangement.

5. The game ball of claim 4, wherein the arrangement is formed by a plurality of ridges selected from the group consisting of curved ridges, parallel ridges, cross hatched ridges, annular ridges, triangular ridges, polygonal ridges, oval ridges, irregularly shaped ridges and combinations thereof.

6. The game ball of claim 4, wherein the arrangement resembles at least a portion of a finger print.

7. The game ball of claim 1 wherein the plurality of outwardly extending raised surfaces on the outer surface are pebble-like projections and wherein the first impression pattern also forms a plurality of interconnected recessed bands that space apart the pebble-like projections.

8. The game ball of claim 1, wherein the outer surface of the cover is formed of a material selected from the group consisting of natural rubber, butyl rubber, natural leather, synthetic leather, polyurethane, a synthetic polymeric plastic material or combinations thereof.

9. The game ball of claim 1 further comprising a layer of windings applied to the bladder, and a carcass disposed over the windings.

10. The game ball of claim 1, wherein the first impression pattern forms at least fifty outwardly extending raised surfaces on the outer surface.

11. The game ball of claim 1, wherein the first impression pattern forms at least one hundred outwardly extending raised surfaces on the outer surface.

12. A unitary sheet of material for sporting goods products, wherein the sheet has improved gripability characteristics, the sheet comprising:

an outer layer having an outer surface and having a first impression pattern integrally formed into the outer surface, the first impression pattern forming a plurality of outwardly extending raised surfaces on the outer surface, the outer layer further having a second impression pattern integrally formed into the raised surfaces of the outer surface, the second impression pattern configured to improve the gripability characteristics of the sheet, the first and second impression patterns extend over generally the entire outer surface of the sheet.

13. The sheet of claim 12, further comprising an inner layer, and wherein the outer layer is coupled to the inner layer.

14. The sheet of claim 12, wherein the second impression pattern includes a plurality of spaced apart ridges.

15. The sheet of claim 14, wherein the plurality of spaced apart ridges form at least a portion of an arrangement, and wherein the arrangement is selected from the group consisting of curved ridges, parallel ridges, cross hatched ridges, annular ridges, triangular ridges, polygonal ridges, oval ridges, irregularly shaped ridges and combinations thereof.

16. The sheet of claim 15, wherein the arrangement resembles at least a portion of a finger print.

17. The sheet of claim 12 wherein the plurality of outwardly extending raised surfaces on the outer surface are pebble-like projections and wherein the first impression pattern also forms a plurality of interconnected recessed bands that space apart the pebble-like projections.

18. The sheet of claim 12, wherein the outer layer is formed of a material selected from the group consisting of natural rubber, butyl rubber, natural leather, synthetic leather, polyurethane, a synthetic polymeric plastic material or combinations thereof.

* * * * *